United States Patent

[11] 3,586,050

| [72] | Inventor | John A. Totten |
| | | Phoenix, Ariz. |
| [21] | Appl. No. | 874,822 |
| [22] | Filed | Nov. 7, 1969 |
| [45] | Patented | June 22, 1971 |
| [73] | Assignee | Equipment Engineering and Manufacturing, Inc. |

[54] AUTOMATIC GAS CHLORINATOR FOR SWIMMING POOL
2 Claims, 5 Drawing Figs.

[52] U.S. Cl. .................................................. 137/624.15,
137/495
[51] Int. Cl. ................................................ F16k 31/48

[50] Field of Search .......................................... 137/624.11,
624.13, 624.15, 495, 624.18

[56] References Cited
UNITED STATES PATENTS
3,267,964   8/1966   Steinmetz .................... 137/624.13
3,368,683   2/1968   Rak .............................. 137/624.15 X

*Primary Examiner*—Alan Cohan
*Attorney*—Drummond, Cahill and Phillips

ABSTRACT: In order to provide automatic and closely regulated chlorine content in swimming pools, timing apparatus is provided to achieve a scheduled plurality of metering rates for introducing gas chlorine into the water in accordance with the requirements dictated by use and environment.

PATENTED JUN22 1971

INVENTOR.
JOHN R. TOTTEN

BY
Drummond, Cahill & Phillips
ATTORNEYS

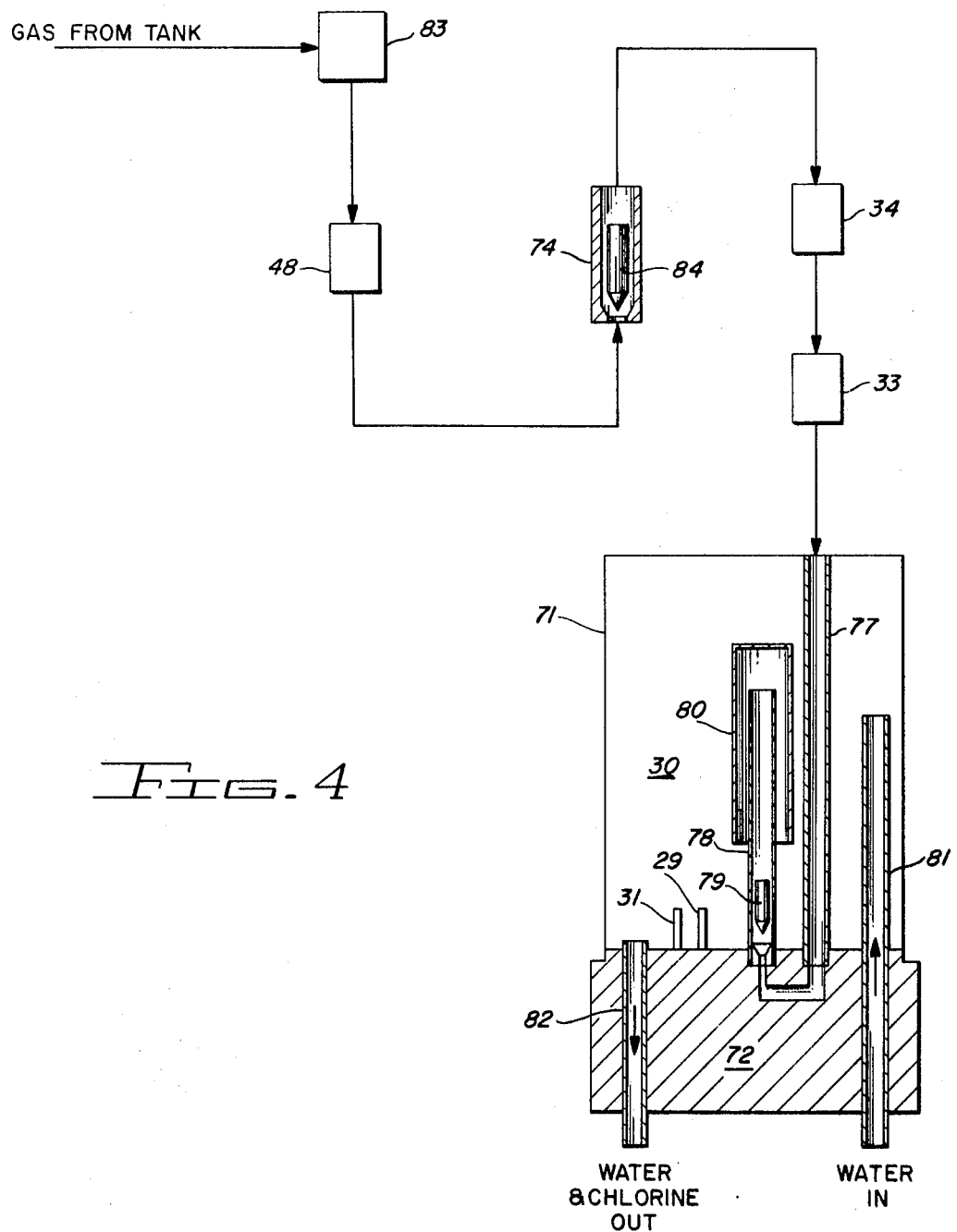

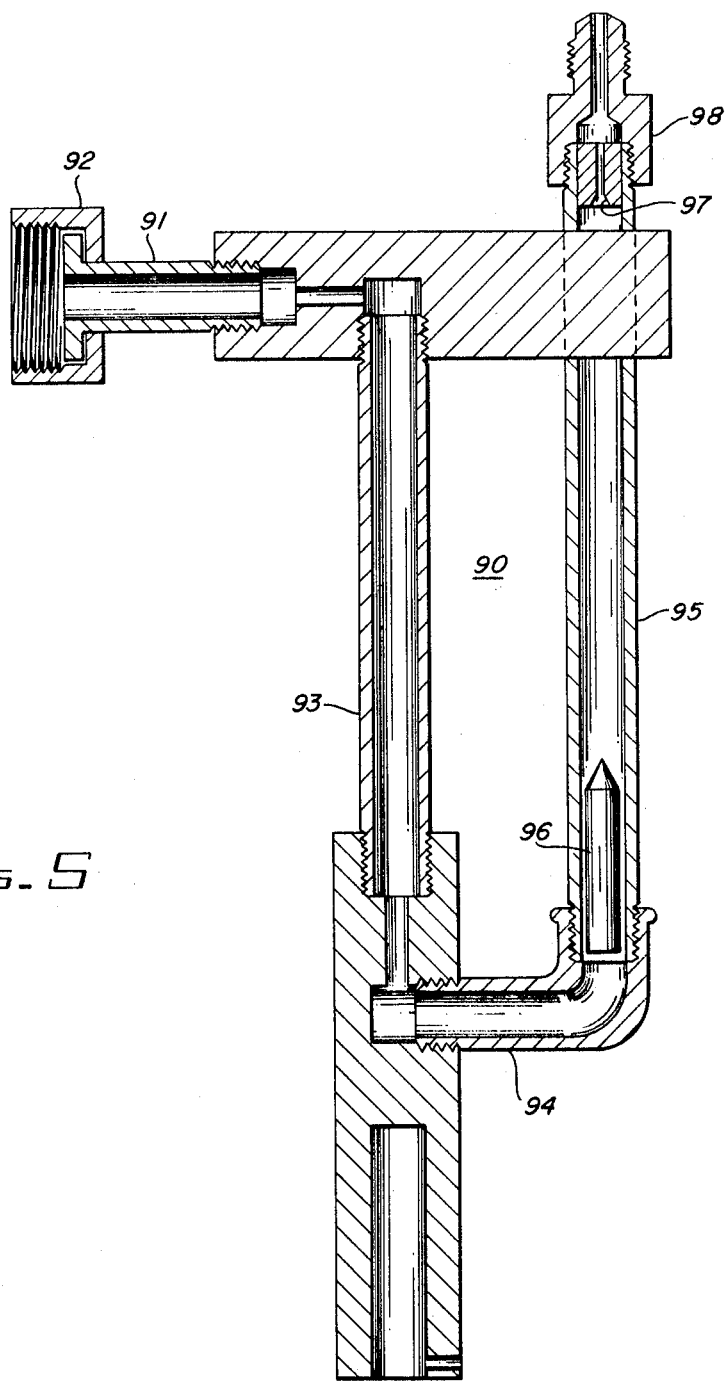

AUTOMATIC GAS CHLORINATOR FOR SWIMMING POOL

This invention relates to the chemical treatment of swimming pools and, more particularly, to apparatus for automatically introducing chlorine into the water as necessary in order to maintain a prescribed chlorine concentration.

In order to prevent the growth of algae and other undesirable organisms, it is conventional practice to introduce chlorine into swimming pool water and to maintain the chlorine at a predetermined concentration between a prescribed minimum and maximum. The chlorine introduced into the water may be in liquid, gas or granular form. Regardless of the form of the concentrated chlorine, it combines with the water to create the very dilute chlorine concentration desirable to inhibit the growth of organisms in accordance with well-known principals. However, both use and exposure to the sun greatly accelerate the loss of chlorine which characteristically boils from the water into the atmosphere. Additionally, some chlorine is lost through combination with contaminants. As a result, the chlorine concentration must be tested rather often and the concentration brought up above the minimum level as necessary. In the smaller swimming pools, chlorine has usually been introduced into the pool manually while the larger pools may be provided with automatic chlorine metering apparatus although the chlorine content of many larger pools is also maintained manually. The automatic chlorinating devices of the prior art, where fitted, have been both costly and inefficient and, for those reasons, have found little favor in the smaller swimming pools and have not been fully accepted for large pools. Thus, it would be highly desirable to provide a relatively simple and efficient adjustable automatic chlorinator to maintain the chlorine content of a given pool within a prescribed range in order to obviate overly frequent testing and manual chlorination.

It is therefore a broad object of this invention to provide automatic chlorination apparatus for swimming pools.

It is a more specific object of this invention to provide automatic metering apparatus for introducing, at a plurality of rates, chlorine in gas form into a swimming pool.

It is a still more specific object of this invention to provide such metering apparatus in which the rates are controlled in accordance with an adjustable time schedule determined empirically from the use and environment of the pool which it services. These and other objects of the invention are achieved, according to a preferred embodiment of the invention, by providing a continuously operating timer including adjustable means to institute, for a predetermined period, the operation of an impulse motor. This phase of operation is designated "low clock" and brings about the addition of chlorine to the pool water by causing an impulse valve to be actuated each time a cam operated switch following a cam driven by the impulse motor is actuated. Second means driven by the timer and comprising a second cam in which both the on and off ramps may be adjusted with respect to one another and to mean time make up a "high clock." When the high clock is turned on, the stroke time delivered by the impulse valve under the influence of the impulse motor is doubled.

The above and other objects of the invention will be more readily apparent to those skilled in the art from the following description of the invention taken in conjunction with the drawings in which:

FIG. 4 is a flow chart representing the elements involved in accomplishing the mixing function; and FIG. 5 is a cross section of an optional safety valve which inhibits operation of the chlorinator if unusual conditions arise which might otherwise bring the system to a dangerous state.

Figure 1:
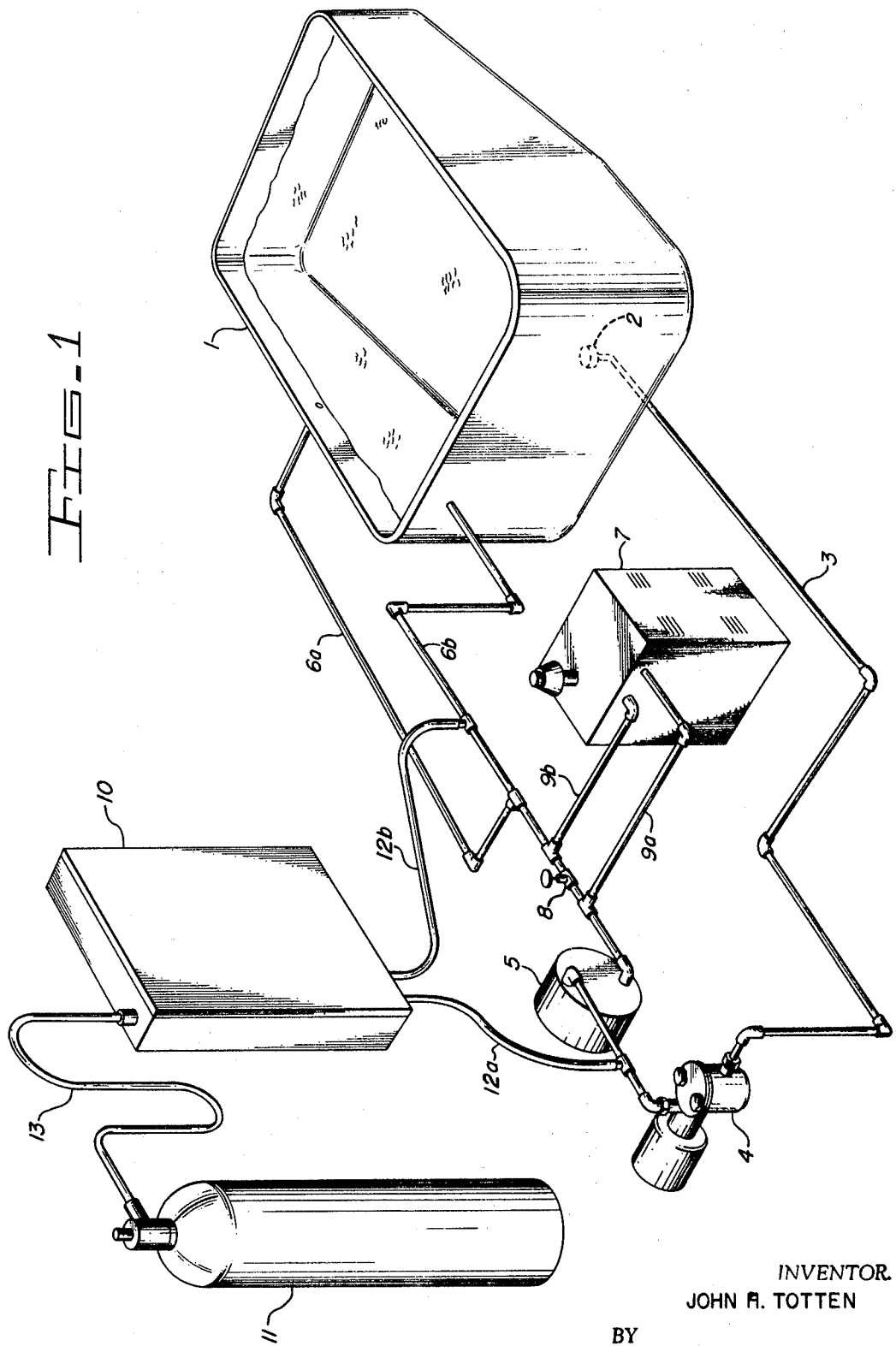
FIG. 1 is a schematic representation of a swimming pool and a filter system illustrating the manner in which a portion of the recirculated water is bypassed through the gas chlorinator of the present invention and returned to the system.

Referring now to FIG. 1, it will be observed that the swimming pool 1 is provided with at least one drain 2 which draws water through a conduit 3 to a motor-driven circulating pump 4. The circulating pump 4 forces the water through a filter 5 such that filtered water is returned to the pool through the conduits 6a and 6b. A water heater 7 may be incorporated into the system in the usual fashion and is brought into operation by closing the valve 8 such that the filtered water is forced to pass through the heater 7 by way of the conduits 9a and 9b.

A chlorinating system comprising automatic control apparatus within a housing 10 and a source of gaseous chlorine represented by the tank 11 receives water under pressure from the circulating pump 4 through the conduit 12a and returns water to which chlorine has been added in a predetermined and scheduled amount to the system through the conduit 12b. Gaseous chlorine from the tank 11 is conveyed to the apparatus within the housing 10 through a conduit 13.

Figure 2:
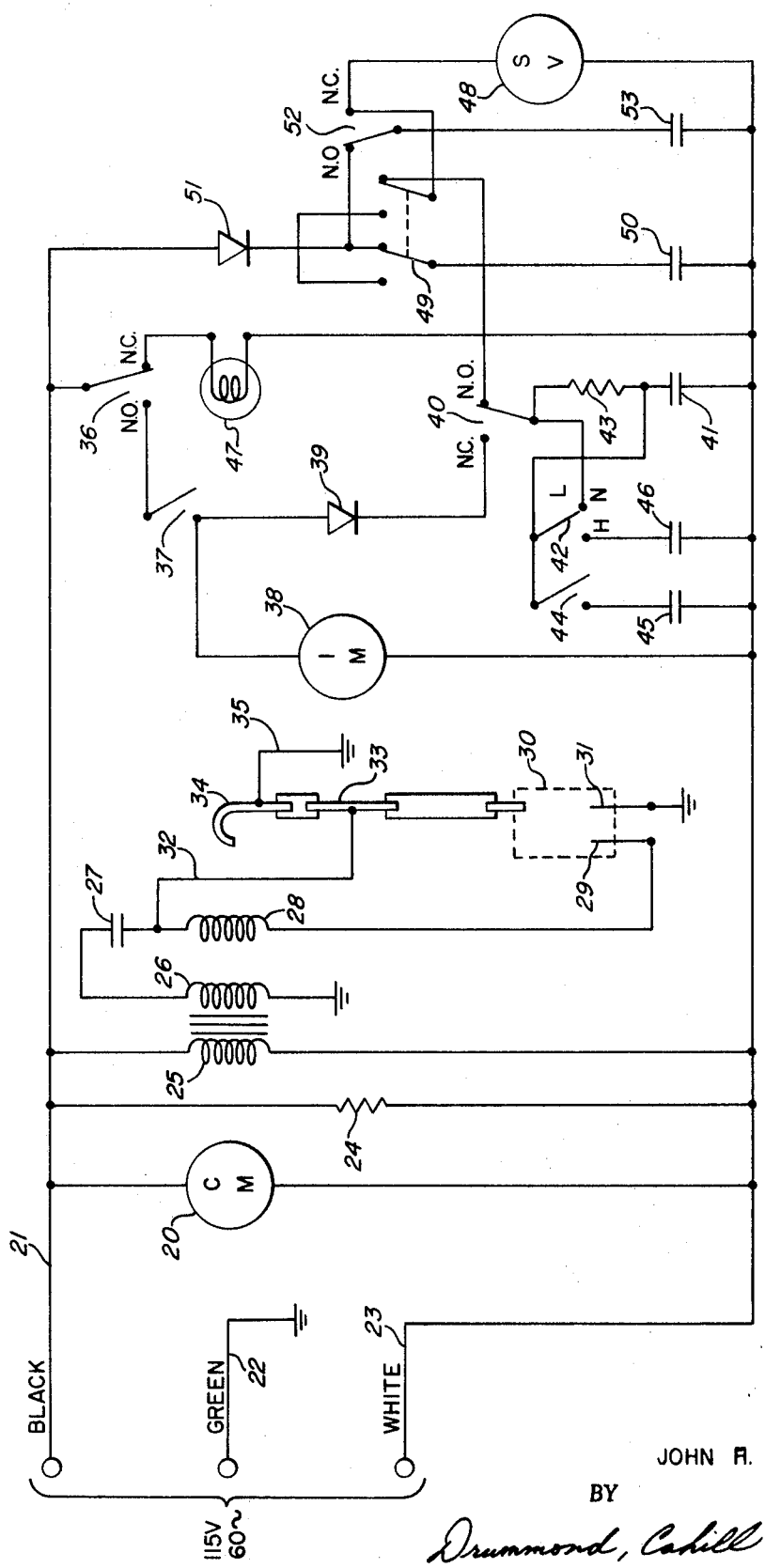
FIG. 2 is a wiring schematic of the gas chlorinator.

Attention is now directed to the schematic wiring diagram of FIG. 2 in which it will be observed that a clock motor 20 is disposed across a single phase 115 volt, 60 cycle source. In accordance with the usual electrical codes, a three-wire circuit is utilized with the center, green wire of the line being connected to chassis ground. For ease of explanation, the black side of the incoming line will be referred to as the "hot" side of the line and the white side will be referred to as the "neutral" side. Disposed in parallel with the clock motor 20 is a heater resistor 24 and the primary winding 25 of the stepup transformer. A 230 volt secondary wiring 26 is connected at one end to chassis ground and at its other end to a capacitor 27 which is disposed in series with a relay coil 28 and an operating electrode 29 placed in the lower portion of a mixing chamber 30. A ground electrode 31, spaced and insulated from the operating electrode 29, is also disposed at the bottom of the mixing chamber 30 to provide a conductive path through water which may be in the mixing chamber 30 under certain conditions to be discussed below. A conductor 32 connects the junction between the capacitor 27 and the relay coil 28 to a silver safety electrode 33 whose function will also be explained below. A silver cane tube 34 is permanently connected to chassis ground through the conductor 35.

The common terminal of relay contact pair 36 is connected to the hot side of the power source. The relay contacts 36 are actuated by energizing the relay coil 28. The normally open contact of the contact pair 36 is connected directly to one of the contacts of a switch 37. An impulse motor 38 is disposed between the second contact of the switch 37 and the neutral side of the power source. In addition, the anode electrode of a diode 39 is connected to the second contact of the switch 37. The cathode electrode of the diode 39 is connected directly to one of the contacts of a cam operated switch 40 which follows a cam rotated by the impulse motor 38. The common terminal of the switch 40 is connected to one end of a resistor 43 which has its other end connected to the common terminal of a three position switch 42, to one plate of a capacitor 41 which has its other plate connected to neutral, and to the common terminal of a "high clock" switch 44. The terminal of the switch 44 is connected to one plate of a capacitor 45 which has its other plate connected to neutral. The third contact of the three position switch 42 is connected to one plate of another capacitor 46 which also has its other plate connected to neutral.

It will be observed that, when the relay coil 28 is not energized, the relay contacts 36 are in the normally closed position to place a warning lamp 47 directly across the power line. The function and operation of this arrangement will be explained below.

The cam operated switch 40 is shown in the normally open position in which, for reasons which will become apparent below, the capacitor 41 may discharge through the solenoid valve 48 provided the switch 49 is in the position shown in FIG. 2. The switch 49 is a spring loaded pushbutton switch which is moved to its alternate position briefly only in a starting-up procedure. In the normal position of the switch 49, it will be observed that a capacitor 50 will be charged through a second diode 51. When the pushbutton switch 49 is actuated, the capacitor 50 will discharge through the solenoid valve 48 to simulate the effect of the discharge of the capacitor 41 during normal operation.

The contact set 52, like the contact set 36, is associated with the relay coil 28 and is shown in its energized position in which a capacitor 53 will also be charged through the diode 51. When the relay coil 28 is deenergized, the contact set 52 will change position to discharge the capacitor 53 through the solenoid valve 48. This function is only of importance when the low clock switch 37 is in the off position such that the impulse motor is not running and serves to keep the mixing apparatus clear as will be described more fully below.

Figure 3:
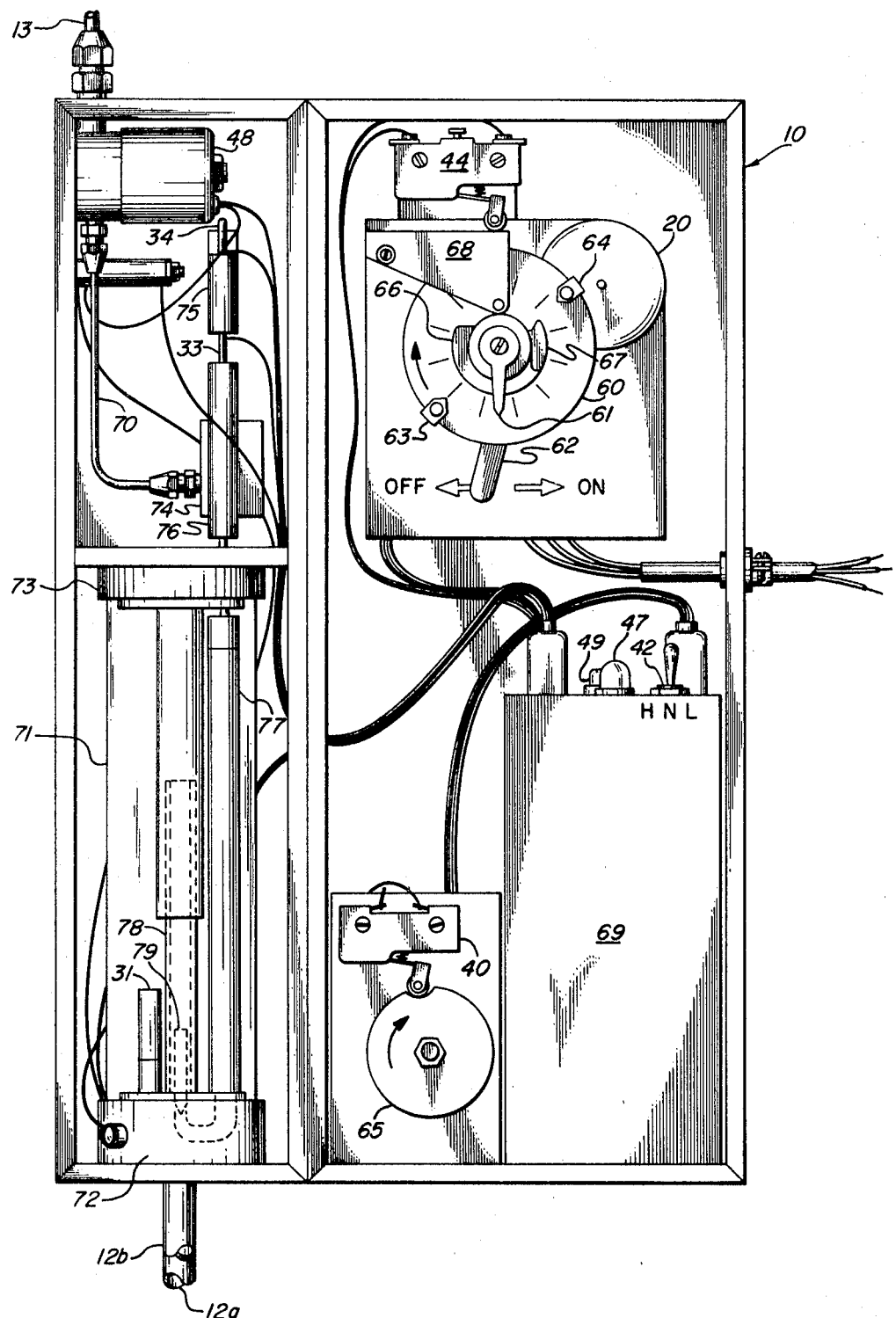
FIG. 3 illustrates the mechanical disposition of the various elements in a presently preferred embodiment of the chlorinator.

The mechanical disposition of the various elements in the presently preferred embodiment of the chlorinator within the housing 10 is shown in FIG. 3. The clock motor 20 drives, through suitable speed reduction gearing, a disc 60 which revolves once in 24 hours and is provided with indicia such that the pointer 61 indicates mean time. A lever 62 permits manual operation of the low clock switch 37. However, the low clock switch 37 is normally turned on by an adjustable tab 63 which may be moved around the circumference of the disc 60 and secured at the indicia representing the time desired to institute low clock operation. Similarly, the low clock switch 37 is normally turned off by a second adjustable tab 64. The tabs 63 and 64 have differently oriented projections depending from their underside to engage cooperating projections extending upwardly from a lever 62 which is thereby pivoted in the desired direction as the disc 60 slowly rotates. In accordance with usual good practice, the lever 62 is provided with detent action to avoid excessive arcing as it is switched from one position to the other.

When the lever 62 is moved to the on position to actuate the low clock switch 37, the impulse motor 38 is energized to rotate the impulse cam 65. As the impulse cam 65 rotates, the cam operated switch 40 will be periodically actuated to charge the capacitor 41 in the manner described above and permits periodic discharge of the capacitor 41 through the solenoid valve 48.

The presence or absence of high clock operation is controlled by adjusting the relative angular disposition of two coaxially aligned, superimposed cams 66 and 67. The high clock "on" cam 66 controls the time at which the cam follower 68 is pivoted upwardly as the disc 60 rotates in the clockwise direction. Similarly, the high clock "off" cam 67 controls the time at which the cam follower 68 drops downwardly into the off position. The switch 44 is actuated by the cam follower 68 to place the capacitor 45 into parallel relationship with the capacitor 41 such that the impulse delivered to the solenoid valve 48 each time the impulse switch 40 is actuated is appreciably larger and longer than when the switch 44 is open. In the interest of safety, many of the electrical components are contained within the secondary housing 69. The warning lamp 47, restart switch 49, and high-normal-low switch 42 are mounted to the top of the secondary housing 69 for easy access. As shown in FIG. 3, a certain degree of modularity is afforded by the use of multiconnection plugs and jacks.

Still referring to FIG. 3 and also to the flow diagram of FIG. 4, the uppermost of the two smaller compartments to the left of the larger compartment comprising the housing 10 contains the solenoid valve 48 which, when actuated, permits chlorine gas to pass through the conduit 13 for introduction into the mixing apparatus. The mixing chamber 30 housed in the lower left compartment of the housing 10 comprises a mixing chamber glass 71, a bottom end block assembly 72 and a top cap assembly 73. As the chlorine gas passes through the connecting line 70, it is introduced into the blocking valve 74 which will be described below. The chlorine gas flows upwardly until it reaches the silver cane tube 34 in which its direction flow is reversed downwardly through a teflon insulator 75, a silver safety electrode 33, a teflon coupler 76, and through a tube 77 within the mixing chamber glass 71 to the bottom end cap assembly 73. The chlorine gas is channeled through the bottom end block assembly 72 to a diffusion tube 78 containing a diffusion plunger 79 adapted to function as a needle valve. The diffusion tube 78 extends upwardly into a diffusion tube cap 80 as indicated by the dashed lines of FIG. 3. Water under pressure from the circulating pump 4 passes through the conduit 12a and is introduced into the mixing chamber 30 through a water-in tube 81. During normal operation, the metered chlorine gas is absorbed into the water within the mixing chamber glass 71, and the mixture is returned to the system through a water-out tube 82 and the conduit 12b which is in communication with the return conduit 6b of the recirculating system.

The operation of the chlorinator is perhaps best understood by simultaneous reference to the schematic diagram of FIG. 2 and to the flow diagram of FIG. 4. However, first referring briefly to FIG. 3 and as previously noted, normal low clock operation commences when the low clock on tab 63 forces the lever 62 to the on position to actuate the switch 37 and institute the periodic pulses to the solenoid valve 48. Referring to the flow chart of FIG. 4, the path of the chlorine gas is through a strainer 83, past the solenoid valve 48, through the blocking valve 74, through the silver cane tube 34 and the silver safety electrode 33 to the mixing chamber 30. The momentary gas impulse is sufficient to lift the blocking valve plunger 84 from its seat within the blocking valve 74.

Water under pressure from the circulating pump 4 is introduced into the mixing chamber through the water-in tube 81 such that the mixing chamber 71 is normally partially filled with water. The impulse of chlorine gas passes downwardly through the tube 77, reverses its flow in the bottom end assembly 72 and moves upwardly through the diffusion tube 78 after lifting the diffusion plunger 79 from its seat. The gas is expelled from the diffusion tube 78 beneath the diffusion tube cap 80 and is dissolved in the water within the mixing chamber 30. The chlorinated water is then returned to the system through the water-out tube 82 and the conduit 12b.

As previously noted, the switch 44 is actuated when its cam follower 68 moves up the ramp of the high clock on cam 66. This closes the contacts of the switch 44 such that the capacitor 45 may charge and discharge in parallel with the capacitor 41 thereby commencing high clock operation which continues until the cam follower 68 drops off the ramp of the high clock "off" cam 67 to reopen the contacts of the switch 44. When the low clock "off" tab 64 thereafter engages the lever 62 and moves it to the off position, the switch 37 is reopened to remove power from the impulse motor 38 such that scheduled impulsing completely ceases until the low clock on tab 63 again institutes low clock operation as described above.

Depending upon the use of the pool and its exposure to the sun, adjustments to the periods during which the low and high clock rates are in effect must be made. For example, after calculating the approximate rates necessary to achieve a proper chlorine residual, it may be determined that the low clock on tab 63 should be placed at the 7 A.M. position on the disc 60 and the low clock off tab at 6 P.M. on the disc 60 and further that the high clock on cam 66 should be set to the 10 A.M. position and the high clock off cam 67 to the 4 P.M. position. Concentration reading should then be taken several times a day as the low clock tabs and the high clock cams are readjusted to maintain the desired chlorine residual. If the chlorine reading is too low in the morning, the low clock off tab 64 may be moved to a later position such that the low clock operation is continued for a longer period. If the reading is too low at midday, high clock operation can be instituted earlier. If the concentration is too high in the afternoon, the high clock off cam 67 may be readjusted to terminate high clock operation earlier. In this manner, an optimum adjustment may be quickly reached which will maintain the desired chlorine residual although seasonal adjustments must be made because of the change in use and exposure to the sun. The high clock on cam 66 and the high clock off cam 67 may be adjusted by loosening a nut (not shown in FIG. 3) which normally clamps them to the rotation of the disc 60.

By throwing the switch 42 to its high rate position, the capacitor 46 is thrown in parallel with the capacitor 41 to provide temporarily increased rate of chlorine flow for brief periods of high demand and also when starting up from an unusually low concentration. By throwing the switch 42 to its low rate position, the resistor 43 is placed in series with the discharge path of the capacitors 41 and 46 such that part of the discharge energy is dissipated in the resistor 43 to temporarily decrease the rate of chlorine flow should the chlorine concentration be somewhat higher than desired.

When the low clock switch 37 is in the off position, the impulse motor 38 will not be running and no chlorine gas will be impulsed into the mixing chamber 30. Water in the mixing chamber will absorb the chlorine gas in the diffusion tube 78 such that the water will eventually reach the silver safety electrode 33 to short out and deenergize the relay coil 28. The contacts 52 of the relay coil will move to the opposite position of that shown in FIG. 2 and discharge the capacitor 53 through the solenoid valve 48 thereby delivering an impulse of gas to clear the water from the diffusion tube 78. The relay coil 28 will again be energized to move the contacts 52 back to the position shown in FIG. 2, and the capacitor 53 will again charge. The relay coil 28 will remain energized until the gas in the diffusion tube is again absorbed by the water at which time the above action will be repeated. This unscheduled impulse rate will vary from about one impulse every 4 hours to no impulse at all depending on the circulation of the pool water and the chlorine concentration of the water.

If for some reason, such as an empty tank 11, there is no gas to impulse and clear the diffusion tube of water when it reaches the silver safety electrode 33, the water will continue to back up such that the relay coil 28 will remain deenergized. The contacts 36 then assume the position shown in FIG. 2 which cuts off energy to the emitting mechanism and energizes the warning light 47 indicating an empty gas cylinder or related malfunction. It will be observed that the contacts 52 and the contacts 36 are shown in energized and deenergized positions, respectively, for purposes of illustration. In operation, both sets of contacts are operated in accordance with the condition of the relay coil 28. The blocking valve 74 and its plunger 84 prevent the water from backing completely out of the chlorinator when the above-described condition is reached and when the tank is being exchanged. In order to resume operation after a new tank of gas has been installed, the restart button 49 may be depressed several times to discharge the capacitor 50 through the solenoid valve 48 to clear the tubes. The tubes will observe to be clear when the relay coil 28 is successfully energized such that the warning lamp 47 is extinguished. Each time the restart switch 49 is released, the capacitor 50 is recharged through the diode 51 as previously noted.

If for some reason no water is introduced into the mixing chamber 30, as might occur should the circulating pump 4 be shut completely down, the electrical connection existing between the electrodes 29 and 31 through the water will be broken to completely deenergize the relay coil 28. The relay contacts 36 will then assume the position shown in FIG. 2 to light the warning lamp 47 and no further impulsing can occur until sufficient water is again introduced into the mixing chamber 30 to complete the circuit between the electrodes 29 and 31.

A potentially dangerous condition could arise if the solenoid valve 48 jammed open such that chlorine gas would be continuously delivered to the chlorinator. A safety control valve 90 illustrated in FIG. 5 may be connected between the tank 11 and the solenoid valve 48 to guard against this contingency. Referring to FIG. 5, a fitting 91 with a union 92 permits coupling the safety control valve 90 directly to the tank in a vertical position. The fitting 98 accepts the conduit 13 which conveys the chlorine gas to the chlorinator. The path of the gas from the tank is then through the fitting 91, down the tube 93, reversed through the elbow fitting 94, and upwardly through the barrel 95 to the chlorinator. The barrel 95 contains a plunger 96 with its pointed end oriented upwardly, and the fitting 98 includes a seat 97 for receiving the plunger 96 in its uppermost position to cut off the flow of chlorine gas to the chlorinator. The clearance between the plunger 96 and the inner walls of the barrel 95 is such that when the solenoid valve 48 is working normally, the plunger 96 surges upwardly with each impulse. The pulse ends when the plunger 96 returns downwardly to its bottom position when the pulse ends and remains there between pulses. If, however, the pulse does not end because of a malfunction, the chlorine gas will continue to flow through the safety control valve 90 such that the plunger 96 will move upwardly against the seat 97 to completely shut off the flow of gas where it will remain until pressure is relieved on the inlet side of the safety control valve. When the pressure has been released, the plunger 96 will return to the down position such that normal operation may be resumed after the malfunction has been corrected.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. An automatic chlorinating system for a swimming pool adapted to meter gaseous chlorine from a pressurized supply into the pool water circulating under the influence of a pump comprising:

A. a continuously running clock motor;
B. an intermittently running impulse motor provided with an impulse cam;
C. a first switch with two positions for alternately passing and interrupting the flow of energy to said impulse motor;
D. first adjustable switch operating means coupled to said clock motor for actuating said first switch to a first one of said positions at a first predetermined time and second adjustable switch operating means coupled to said clock motor for actuating said first switch to the second one of said positions at a second predetermined time;
E. a solenoid valve connected to the supply of pressurized gaseous chlorine and adapted to permit the flow of chlorine gas when energized;
F. a second switch including an impulse cam follower operated by said impulse cam, said second switch having a common terminal and first and second contacts to which the common terminal is alternately switched as said impulse cam follower changes position;
G. a diode connected between said first switch and said first contact such that electrical energy is applied to said diode at the same time as to said impulse motor;
H. a first capacitor connected to the common terminal of said second switch such that it will charge through said diode when said second switch is in a first of its alternate positions;
I. means electrically coupling said second contact of said second switch to said solenoid valve such that said capacitor will discharge through and temporarily energize said solenoid valve when said second switch is in the second of its alternate positions;
J. a mixing chamber;
K. means coupling said solenoid valve to said mixing chamber such that gaseous chlorine is admitted to said mixing chamber when said solenoid valve is energized;
L. means for admitting circulating pool water into the mixing chamber such that the water can absorb the gaseous chlorine; and
M. means for returning the circulating pool water from the mixing chamber to the circulating system.

2. The automatic chlorinating system of claim 1 which further includes:
  A. a third switch coupled to the common terminal of said second switch, said third switch having a normally open position and a closed position;
  B. a second capacitor connected to a normally open contact of said second switch; and
  C. third adjustable switch operating means coupled to said clock motor for actuating said third switch from its normally open position to a closed position at a third predetermined time, and fourth adjustable switch operating means coupled to said clock motor for releasing said third switch back to its normally open position at a fourth predetermined time such that said second capacitor augments said first capacitor causing said solenoid valve to be energized for a longer period each time said second switch is actuated when said third switch is in its closed position than when said third switch is in its normally open position.